No. 791,372. PATENTED MAY 30, 1905.
R. A. SEADERS.
HORSE BLANKET.
APPLICATION FILED JUNE 1, 1904.
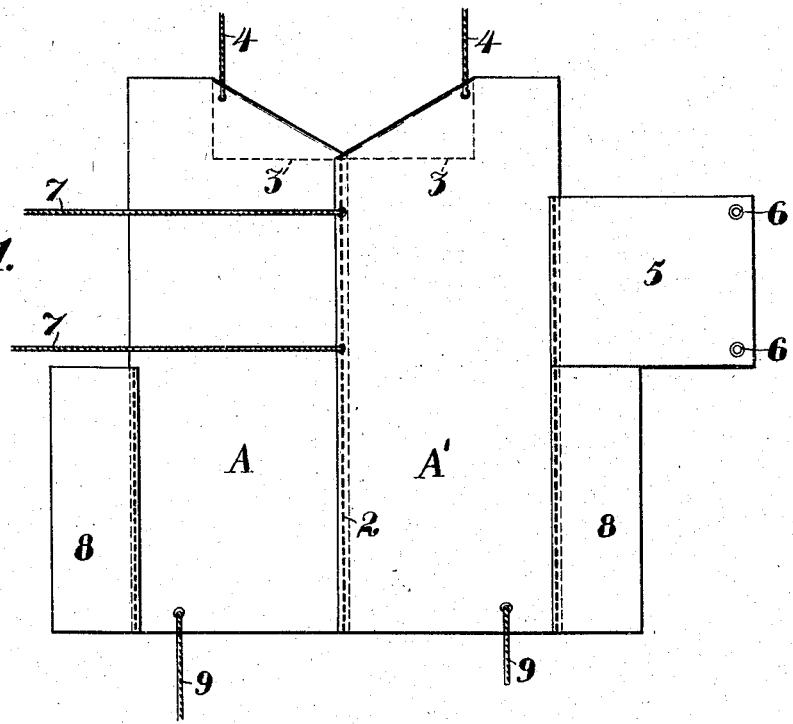
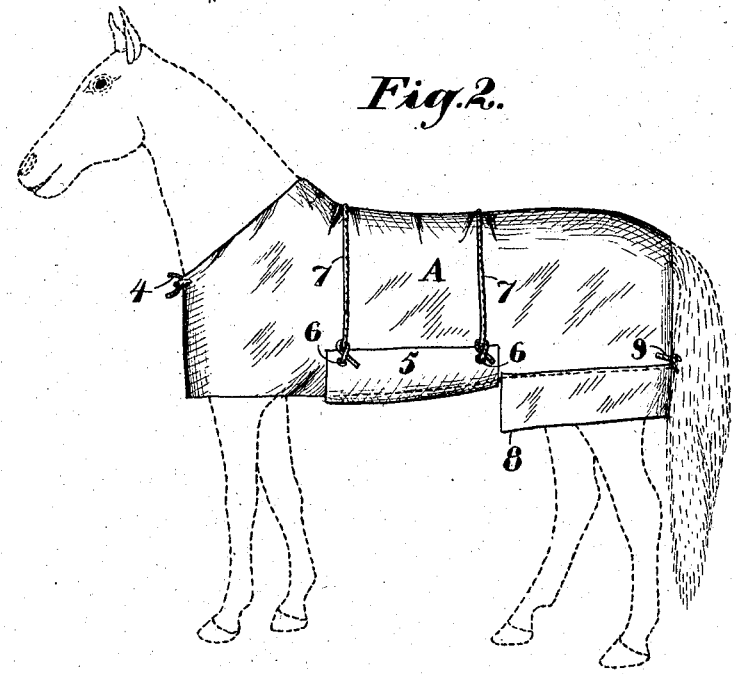
Witnesses:—
Inventor,
Reuben A. Seaders
by Geo. H. Strong
Atty.

No. 791,372. Patented May 30, 1905.

UNITED STATES PATENT OFFICE.

REUBEN A. SEADERS, OF SAN FRANCISCO, CALIFORNIA, ASSIGNOR OF ONE-HALF TO RICK DE BERNARDI, OF SAN FRANCISCO, CALIFORNIA.

HORSE-BLANKET.

SPECIFICATION forming part of Letters Patent No. 791,372, dated May 30, 1905.

Application filed June 1, 1904. Serial No. 210,657.

*To all whom it may concern:*

Be it known that I, REUBEN A. SEADERS, a citizen of the United States, residing in the city and county of San Francisco and State of California, have invented new and useful Improvements in Horse-Blankets, of which the following is a specification.

My invention relates to an improved construction of horse blankets or covers, such as are commonly used for night-blankets, and also for protecting the animal under any conditions when a blanket is necessary.

It consists in the formation of a blanket by a union of sections stitched together and folded so as to produce the desired shape without cutting or shaping the material except to cut it into the proper lengths for the purpose.

It also comprises details of construction, which will be more fully explained by reference to the accompanying drawings, in which—

Figure 1 is a view of the blanket extended, showing the construction. Fig. 2 shows the blanket in place upon the animal.

In the manufacture of blankets or covers for the purpose of protecting horses such blankets have been made to fit the body of the animal, notably as shown in Patent No. 134,921, dated January 14, 1873; but by cutting the material so that when placed upon the horse the cover will fit snugly to the body and extend down over the legs with a more or less close fit. The cutting and shaping necessary for this purpose makes a blanket of this description very expensive.

It is the object of my invention to provide a blanket which is cheap and easily constructed, and it only requires the cutting of the material from the piece into the desired lengths, which are then stitched together and the blanket thus completed.

As shown in the drawings, A A' are two lengths of material such as it is desired to use to form a blanket, this material being woven or produced in certain widths which are sufficient for my purpose, these two pieces being cut of such length as to extend from the tail to the breast and so that they will lap or meet across the breast of the horse. In order to provide for the angle from the breast up to the top of the withers, these two pieces are stitched together along the center line, as at 2, the stitching extending from the tail to a point which is approximately at the top of the withers or base of the upper part of the neck of the animal, where the stitching ceases. As the ends of the two parts extend enough farther forward so that the lower portions will fold across the breast of the animal, I dispose of the upper part which extends beyond the stitching by folding the angles inwardly, as shown in dotted lines at 3, and this forms the necessary cut-out or forked portion to allow the blanket when placed upon the animal to fit around the neck and be tied or secured across the breast at the front by straps or cords, as at 4. If desired, these folded portions may be stitched to the contiguous portions of the extension, or they may be loose and simply be folded inward under the body portion of the blanket.

Upon the outer side of one of the parts A or A' is stitched another strip of material, 5, so that it projects at right angles with the central seam 2 and to such a distance that when the blanket is placed upon the animal with the central seam along the line of the backbone this strip 5 may be passed around beneath the body of the animal. At each angle at the outer end of this strip are holes 6, adapted to receive the ends of the cords or straps 7, which are fixed to the other part A of the blanket. Thus the piece 5 may be passed around the body and secured by the cords 7, and the blanket will be securely held upon the animal, so that he can lie down or get up without displacing it. In order to protect the hind legs and to prevent the animal from becoming dirty at this point, I have shown the strips 8 of material, which are stitched upon the outer edges of the rear portion of the sections A A', and when the blanket is placed upon the horse these strips hang down loosely, extending from the rear edge of the body-piece 5. Cords 9 are secured to the rear edges of the parts A and A', and these cords being tied together beneath the tail of the animal the flaps 8 will also be carried around and overlap at this point, thus protecting the legs with this loose envelop, while at the same time allowing the animal free movement.

Having thus described my invention, what I claim, and desire to secure by Letters Patent, is—

1. A blanket or cover for horses consisting of widths of material stitched together on a central line terminating at the withers, said widths extending forwardly from the withers and having the upper angles turned inwardly to form triangular folds stitched to the contiguous portions of the extensions, cords or straps attached to the front lower edges by which the front is secured around the breast of the animal, a supplemental strip stitched to one of the main portions and adapted to pass beneath the body, said strip having means of attachment upon its end and corresponding connecting means secured to the other side of the blanket and adapted to engage with the said means upon the body-strip.

2. A horse cover or blanket consisting of widths of material stitched together on a central line which terminates at the top of the withers of the animal, the lower part of said widths extending sufficiently in advance of the stitched portion to pass around the breast and the upper angles being folded and stitched beneath the widths so as to fit this portion around the neck of the animal, means by which the lower ends are secured across the animal's breast, a body-piece stitched to the side of one of the widths so as to be passed around beneath the animal, means carried by said piece and by the opposite side of the blanket whereby said body-piece may be secured in place, strips attached to each side at the rear ends of the main widths adapted to form a loose inclosure around the rear portion of the animal, and means for drawing the rear ends of the widths together beneath the animal's tail.

In testimony whereof I have hereunto set my hand in presence of two subscribing witnesses.

REUBEN A. SEADERS.

Witnesses:
  HENRY P. TRICOU,
  S. H. NOURSE.